(12) United States Patent
Yadav et al.

(10) Patent No.: US 12,480,421 B2
(45) Date of Patent: Nov. 25, 2025

(54) TURBINE ENGINE HAVING A VARIABLE PITCH AIRFOIL ASSEMBLY

(71) Applicant: GENERAL ELECTRIC COMPANY, Schenectady, NY (US)

(72) Inventors: Abhijeet Jayshingrao Yadav, Bangalore (IN); Nitesh Jain, Bangalore (IN); Nicholas Joseph Kray, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/492,837

(22) Filed: Oct. 24, 2023

(65) Prior Publication Data

US 2025/0084771 A1  Mar. 13, 2025

(30) Foreign Application Priority Data

Sep. 13, 2023 (IN) .............................. 202311061628

(51) Int. Cl.
*F01D 7/00* (2006.01)
*F01D 5/02* (2006.01)
*F01D 17/16* (2006.01)

(52) U.S. Cl.
CPC .............. *F01D 17/16* (2013.01); *F01D 5/027* (2013.01); *F01D 7/00* (2013.01); *F05D 2220/32* (2013.01); *F05D 2240/12* (2013.01); *F05D 2260/60* (2013.01)

(58) Field of Classification Search
CPC . F01D 17/16; F01D 5/027; F01D 7/00; F05D 2220/32; F05D 2240/12; F05D 2260/60; B64C 11/06
See application file for complete search history.

(56) References Cited

U.S. PATENT DOCUMENTS

| | | | |
|---|---|---|---|
| 2,533,358 A | 12/1950 | Cushman | |
| 2,715,446 A * | 8/1955 | Felt | F16F 15/32 416/145 |
| 3,663,119 A | 5/1972 | Brooking et al. | |
| 3,687,569 A | 8/1972 | Klompas | |
| 3,781,131 A | 12/1973 | McMurtry | |
| 3,922,852 A | 12/1975 | Drabek | |
| 4,302,155 A | 11/1981 | Grimes et al. | |
| 4,717,312 A * | 1/1988 | Seeley | B64C 11/06 416/89 |
| 4,863,352 A | 9/1989 | Hauser et al. | |
| 5,415,527 A | 5/1995 | Godwin | |

(Continued)

OTHER PUBLICATIONS

Matweb, Steels, general properties, "https://www.matweb.com/search/datasheet_print.aspx?matguid=10e1c14130cd4ed6ae64b85723be53af".*

(Continued)

*Primary Examiner* — Nathaniel E Wiehe
*Assistant Examiner* — Theodore C Ribadeneyra
(74) *Attorney, Agent, or Firm* — McGarry Bair PC

(57) ABSTRACT

A turbine engine comprising a fan section, a compressor section, a combustion section, and a turbine section in serial flow arrangement and defining a stator portion and a rotor portion, which rotates about an engine centerline. The rotor portion comprising a variable pitch airfoil assembly. The variable pitch airfoil assembly having an airfoil and a balancing insert.

20 Claims, 5 Drawing Sheets

(56) References Cited

U.S. PATENT DOCUMENTS

| | | | | |
|---|---|---|---|---|
| 6,015,264 | A * | 1/2000 | Violette | B64C 11/20 |
| | | | | 416/207 |
| 6,227,805 | B1 | 5/2001 | Besse et al. | |
| 6,442,816 | B1 | 9/2002 | Kao | |
| 7,581,929 | B2 * | 9/2009 | Carvalho | F04D 29/324 |
| | | | | 416/233 |
| 8,753,088 | B2 * | 6/2014 | Pfeiffer | F01D 5/3023 |
| | | | | 416/209 |
| 8,882,464 | B2 * | 11/2014 | Smith | B64C 11/24 |
| | | | | 416/145 |
| 9,764,821 | B2 * | 9/2017 | Burford | B64C 11/06 |
| 10,072,510 | B2 | 9/2018 | Miller et al. | |
| 10,100,653 | B2 | 10/2018 | Miergarth et al. | |
| 10,293,918 | B2 * | 5/2019 | Derrez | B64C 11/14 |
| 10,465,701 | B2 * | 11/2019 | Craig | F04D 29/323 |
| 11,572,889 | B2 * | 2/2023 | Millier | F04D 29/362 |
| 2012/0055137 | A1 * | 3/2012 | Bouiller | F04D 29/362 |
| | | | | 60/226.3 |
| 2013/0039765 | A1 * | 2/2013 | Smith | B64C 11/30 |
| | | | | 416/145 |
| 2013/0094943 | A1 * | 4/2013 | Bouru | F04D 29/056 |
| | | | | 415/170.1 |
| 2013/0164142 | A1 | 6/2013 | Tutaj et al. | |
| 2018/0135557 | A1 * | 5/2018 | Pouyau | F02K 3/06 |

OTHER PUBLICATIONS

Matweb, overview of materials for epoxy/carbon fiber composite, "https://www.matweb.com/search/datasheet_print.aspx?matguid=39e40851fc164b6c9bda29d798bf3726".*

* cited by examiner

TURBINE ENGINE HAVING A VARIABLE PITCH AIRFOIL ASSEMBLY

CROSS-REFERENCE TO RELATED APPLICATION(S)

This application claims priority to Indian Provisional Application 202311061628, filed Sep. 13, 2023, which is incorporated herein by reference in its entirety.

TECHNICAL FIELD

The disclosure generally relates to turbine engine having an airfoil assembly, and more specifically to a turbine engine having a variable pitch airfoil assembly.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blades and stationary vanes. The blades are mounted to rotating disks, while the vanes are mounted to stator disks.

During operation air is brought into the compressor section through the fan section where it is then pressurized in the compressor and mixed with fuel and ignited in the combustor for generating hot combustion gases which flow downstream through the turbine stages where the air is expanded and exhausted out an exhaust section. The expansion of the air in the turbine section is used to drive the rotating sections of the fan section and the compressor section. The drawing in of air, the pressurization of the air, and the expansion of the air is done, in part, through rotation of various rotating blades mounted to respective disks throughout the fan section, the compressor section, and the turbine section, respectively. The rotation of the rotating blades imparts mechanical stresses along various portions of the blade; specifically, where the blade is mounted to the disk.

In some turbine engines, a variable pitch airfoil can be included, which can be selectively rotated about a generally span-wise axis to adjust or otherwise tailor the flow of fluid over the variable pitch airfoil. The variable pitch airfoil is movable through use of a trunnion and a spar. The trunnion can rotate about a rotational axis, which in turn rotates the spar and the variable pitch airfoil. The trunnion is coupled to or otherwise formed with the spar.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
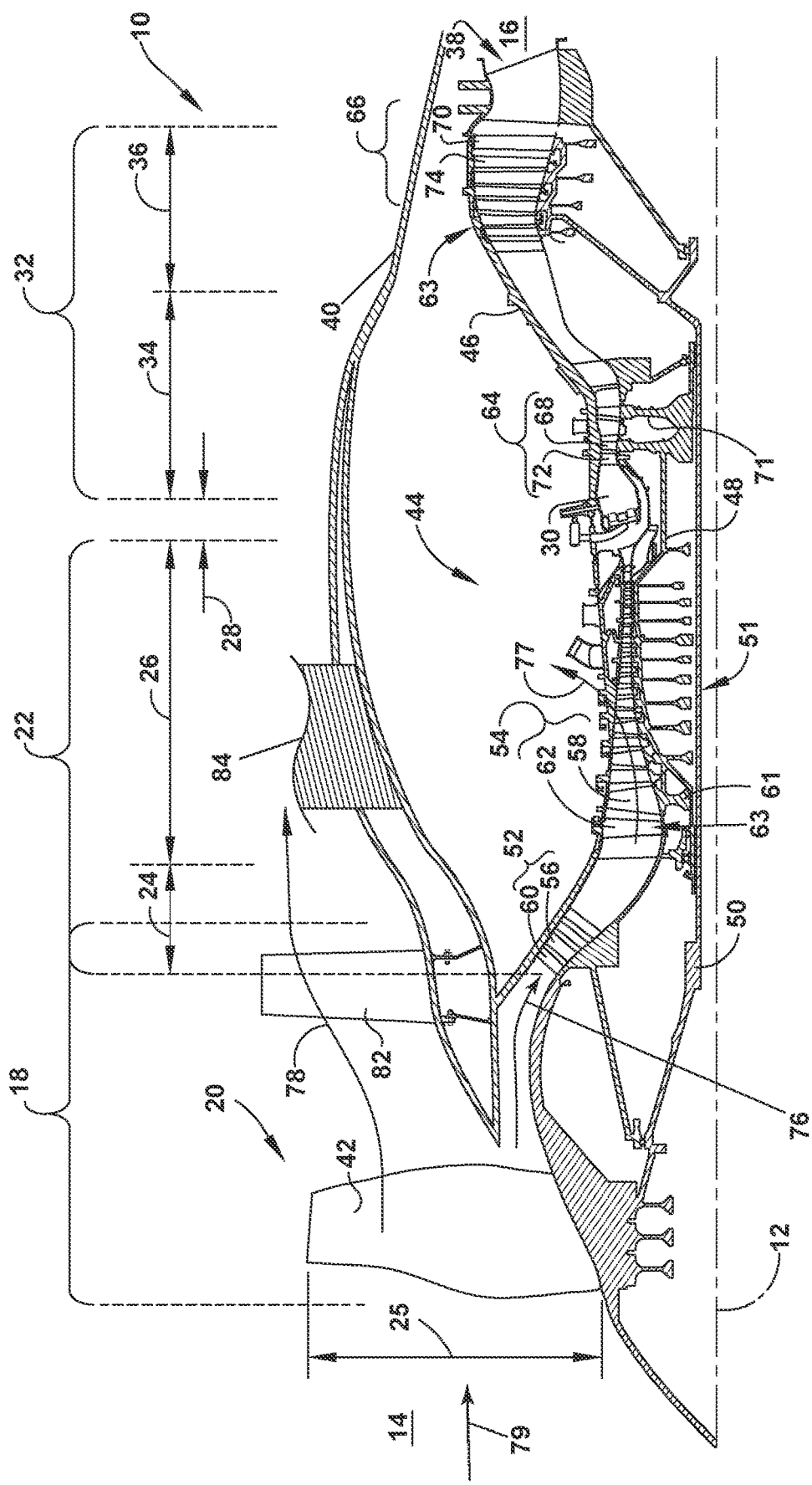
FIG. 1 is a schematic cross-sectional view of a turbine engine, the turbine engine being an unducted or open rotor turbine engine accordance with an exemplary embodiment of the present disclosure.

Aspects of the disclosure herein are directed to an airfoil assembly for a turbine engine. The airfoil assembly includes an airfoil, a spar, and a trunnion. The spar couples the airfoil to the trunnion. The trunnion can mount the airfoil assembly to a rotatable component (e.g., a disk). The airfoil assembly further includes a sleeve extending over a respective portion of the spar and a balancing insert provided along at least one of either the sleeve or within an interior of the spar.

The balancing insert can be used to balance the airfoil assembly, specifically an airfoil assembly with a variable pitch. The balancing of the airfoil assembly is used to reduce unbalance, and hence vibration stresses, within the airfoil assembly. Further, the balancing insert can be used to balance a plurality of airfoil assemblies mounted to a common rotatable component. At least one airfoil assembly of the plurality of airfoil assemblies can include a respective balancing inset to ensure that the plurality of airfoil assemblies are consistently balanced. For purposes of illustration, the present disclosure will be described with respect to an airfoil assembly for a turbine engine, specifically a fan blade of the turbine engine. It will be understood, however, that aspects of the disclosure described herein are not so limited and can have general applicability within other engines or within other portions of the turbine engine. For example, the disclosure can have applicability for an airfoil assembly in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked composite plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine, specifically an open rotor or unducted turbine engine 10 for an aircraft. The unducted turbine engine 10 has a generally longitudinally extending axis or engine centerline 12 extending from a forward end 14 to an aft end 16. The unducted turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 27, a combustion section 28 including a combustor 30, a turbine section 32 including an HP turbine 34, and an LP turbine 36, and an exhaust section 38. The unducted turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a housing or nacelle 40, of the unducted turbine engine 10 extends from the forward end 14 of the unducted turbine engine 10 toward the aft end 16 of the unducted turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the unducted turbine engine 10, specifically, the fan section 18 extends radially outward from the nacelle 40. The fan section 18 includes a set of fan blades 42, and a set of stationary fan vanes 82 downstream the set of fan blades 42, both disposed radially from and circumferentially about the engine centerline 12. The unducted turbine engine 10 includes any number of one or more sets of rotating blades or propellers (e.g., the set of fan blades 42) disposed upstream of the set of stationary fan vanes 82. As a non-limiting example, the unducted turbine engine 10 can include multiple sets of fan blades 42 or fan vanes 82. As such, the unducted turbine engine 10 is further defined as an unducted single-fan turbine engine. The unducted turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the unducted turbine engine 10.

An HP shaft or spool 48 disposed coaxially about the engine centerline 12 of the unducted turbine engine 10 drivingly connects the HP turbine 34 to the HP compressor 27. An LP shaft or spool 50, which is disposed coaxially about the engine centerline 12 of the unducted turbine engine 10 within the larger diameter annular HP spool 48, drivingly connects the LP turbine 36 to the LP compressor 24 and fan 20. The spools 48, 50 are rotatable about the engine centerline 12 and coupled to a set of rotatable elements, which collectively define a rotor 51.

It will be appreciated that the unducted turbine engine 10 is either a direct drive or integral drive engine utilizing a reduction gearbox coupling the LP shaft or spool 50 to the fan 20.

The LP compressor 24 and the HP compressor 27, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor section 22 are mounted to a disk 61, which is mounted to the corresponding one of the HP and LP spools 48, 50, with each stage having its own disk 61. The static compressor vanes 60, 62 for a stage of the compressor section 22 are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP spools 48, 50, with each stage having a dedicated disk 71. The static turbine vanes 72, 74 for a stage of the turbine section 32 are mounted to the engine casing 46 in a circumferential arrangement.

Rotary portions of the unducted turbine engine 10, such as the blades 56, 58 68, 70 among the compressor section 22 and the turbine section 32 are also referred to individually or collectively as the rotor 51. As such, the rotor 51 refers to the combination of rotating elements throughout the unducted turbine engine 10.

Complementary to the rotary portions, the stationary portions of the unducted turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the unducted turbine engine 10.

The nacelle 40 is operatively coupled to the unducted turbine engine 10 and covers at least a portion of the engine core 44, the engine casing 46, or the exhaust section 38. At least a portion of the nacelle 40 extends axially forward or upstream the illustrated position. For example, the nacelle 40 extends axially forward such that a portion of the nacelle 40 overlays or covers a portion of the fan section 18 or a booster section (not illustrated) of the unducted turbine engine 10.

It will be appreciated that the unducted turbine engine 10 can be split into at last two separate portions; a rotor portion and a stator portion. The rotor portion can be defined as any portion of the unducted turbine engine 10 that rotates about a respective rotational axis. the stator portion can be defined by a combination of non-rotating elements provided within the unducted turbine engine 10. As a non-limiting example, the rotor portion can include the plurality of fan blades 42, the compressor blades 56, 58, or the turbine blades 68, 70. As a non-limiting example, the stator portion can include the plurality of fan vanes 82, the static compressor vanes 60, 62, or the static turbine vanes 72, 74.

During operation of the unducted turbine engine 10, a freestream airflow 79 flows against a forward portion of the unducted turbine engine 10. A portion of the freestream airflow 79 enters an annular area 25 defined by a swept area between an outer surface of the nacelle 40 and the tip of the fan blade 42, with this air flow being an inlet airflow 78. A portion of the inlet airflow 78 enters the engine core 44 and is described as a working airflow 76, which is used for combustion within the engine core 44.

More specifically, the working airflow 76 flows into the LP compressor 24, which then pressurizes the working airflow 76 thus defining a pressurized airflow that is supplied to the HP compressor 27, which further pressurizes the air. The working airflow 76, or the pressurized airflow, from the HP compressor 27 is mixed with fuel in the combustor 30 and ignited, thereby generating combustion gases. Some work is extracted from these gases by the HP turbine 34, which drives the HP compressor 27. The combustion gases are discharged into the LP turbine 36, which extracts additional work to drive the LP compressor 24, and the working airflow 76, or exhaust gas, is ultimately discharged from the unducted turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the unducted turbine engine 10.

The inlet airflow 78 flows through the set of fan blades 42, over at least a portion of the set of stationary fan vanes 82, and the nacelle 40 of the unducted turbine engine 10. The inlet airflow 78 then flows past the set of stationary fan vanes 82, following the curvature of the nacelle 40 and toward the exhaust section 38. A pylon 84 mounts the unducted turbine engine 10 to an exterior structure (e.g., a fuselage of an aircraft, a wing, a tail wing, etc.).

The working airflow 76 and at least some of the inlet airflow 78 merge downstream of the exhaust section 38 of the unducted turbine engine 10. The working airflow 76 and the inlet airflow 78, together, form an overall thrust of the unducted turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in heightened temperature environments or a hot portion of the unducted turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 27.

Figure 2:
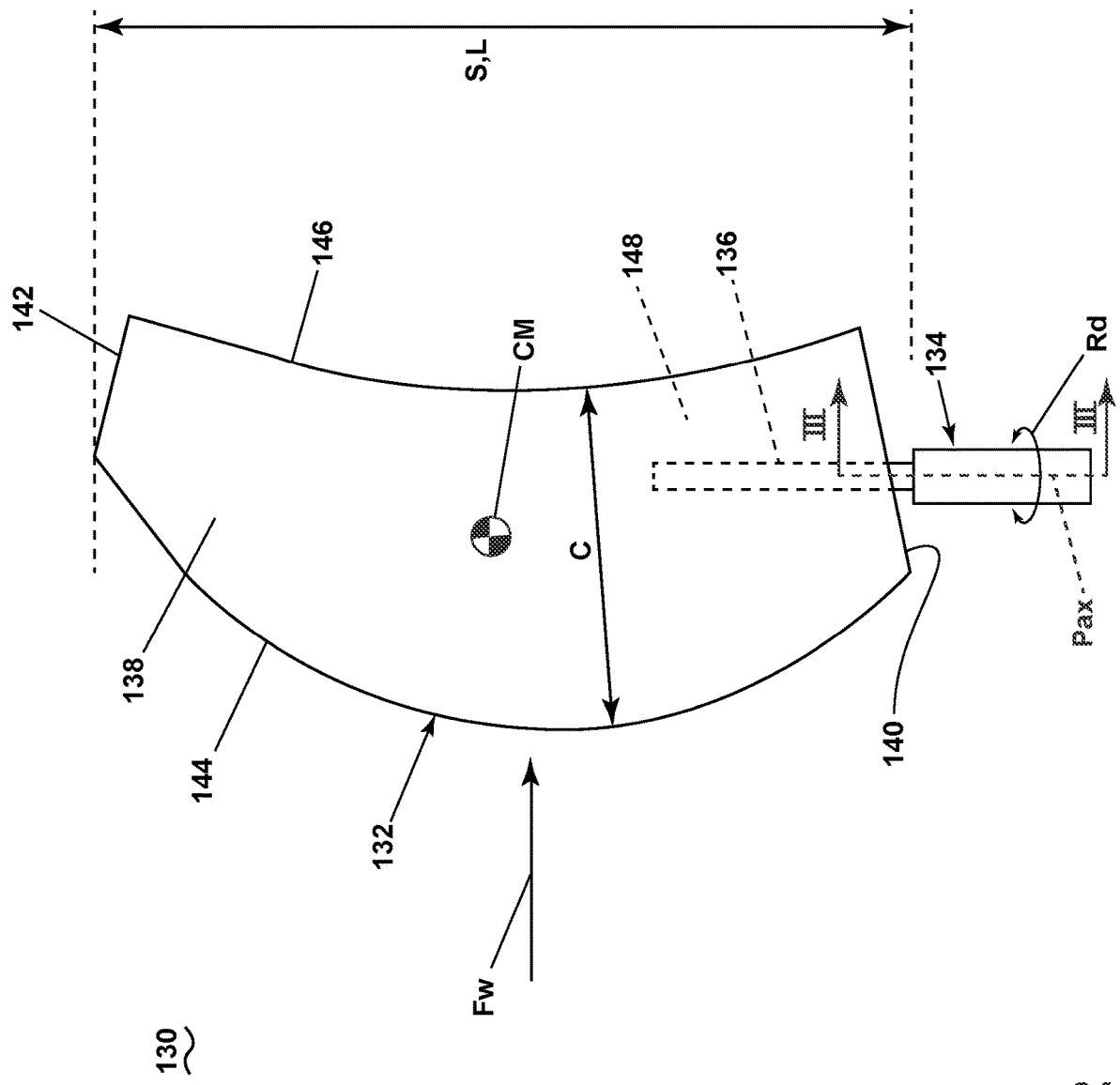
FIG. 2 is a schematic illustration of an airfoil assembly suitable for use within the turbine engine of FIG. 1, the airfoil assembly including an airfoil, a trunnion, and a spar.

FIG. 2 is schematic illustration of an airfoil assembly 130 suitable for use within the turbine engine 10 of FIG. 1. The airfoil assembly 130 can include an airfoil 132 that is any suitable airfoil of the turbine engine 10. As a non-limiting example, the airfoil 132 can be a blade of the plurality of fan blades 42, or a blade from the compressor blades 56, 58 or the turbine blades 68, 70. In the instance where the airfoil 132 is a blade, the airfoil assembly 130 can be provided within the rotor portion of the turbine engine 10. It is contemplated that the airfoil 132 can be a blade, vane, airfoil, or other component of any turbine engine, such as, but not limited to, a gas turbine engine, a turboprop engine, a turboshaft engine, a ducted turbofan engine, an unducted turbofan engine or an open rotor turbine engine.

The airfoil 132 can include an outer wall 138 bounding an airfoil interior 148. The outer wall 138 can extend between a leading edge 144 and a trailing edge 146 to define a chordwise direction (C). The outer wall 138 can further extend between a root 140 and a tip 142 to define a spanwise direction (S). The outer wall 138 can be a composite wall made of one or more layers of composite material. The one or more layers of material can be applied during the same stage or different stages of the manufacturing of the airfoil 132.

At least a portion of the airfoil 132 can include a composite material, such that the airfoil assembly 130 can be defined as a composite airfoil assembly. By way of non-limiting example, outer wall 138 can include at least PMC portion or a polymeric portion. The PMC can include, but is not limited to, a matrix of thermoset (epoxies, phenolics) or thermoplastic (polycarbonate, polyvinylchloride, nylon, acrylics) and embedded glass, carbon, steel, or Kevlar fibers. It will be appreciated that the airfoil 132 can include a composite material, a metallic material, any other suitable material or a combination thereof.

The airfoil assembly 130 can further include a spar 136 and a trunnion 134. The spar 136 can extend into the airfoil interior 148. The spar 136 can extend from the root 140. The spar 136 can be operably coupled to the trunnion 134. The trunnion 134 can include any suitable material such as, but no limited to, a metallic material or a composite material. It will be appreciated that the term composite material can further include metals but with a composite architecture (e.g., a metal matrix composite). In the case of a composite material, the trunnion 134 can be any suitable composite material such as a 2D or 3D composite, a laminate skin, a woven or a braided composite, or any other suitable composite.

The airfoil 132 has a span length (L) measured along the spanwise direction (S) from the root 140 at 0% the span length (L) to the tip 142 at 100% the span length (L). An entirety of the spar 136 can be located below 20% of the span length (L). Alternatively, the spar 136 can extend past 20% of the span length (L).

The airfoil assembly 130 can be defined by a center of mass (CM). The center of mass (CM) can be provided along any portion of the airfoil assembly 130 or be offset from the airfoil assembly 130.

During operation of the airfoil assembly 130, the trunnion 134 can rotate about a pitch axis (Pax) in a rotational direction (Rd). As the spar 136 couples the trunnion 134 to the airfoil 132, rotation of the trunnion 134 in the rotational direction (Rd) causes the airfoil 132 to rotate about the pitch axis (Pax). This rotation can be used to control the pitch of the airfoil assembly 130 such that the airfoil assembly 130 is defined as a variable pitch airfoil assembly. As such, the airfoil assembly 130 can be defined as a variable pitch airfoil assembly. The pitch of the airfoil assembly 130 can be varied based on the operation or intended operation of the turbine engine (e.g., the turbine engine 10 of FIG. 1) that the airfoil assembly 130 is provided on. A working airflow (Fw) can flow over a respective portion of the airfoil assembly 130, specifically, the airfoil 132.

Figure 3:
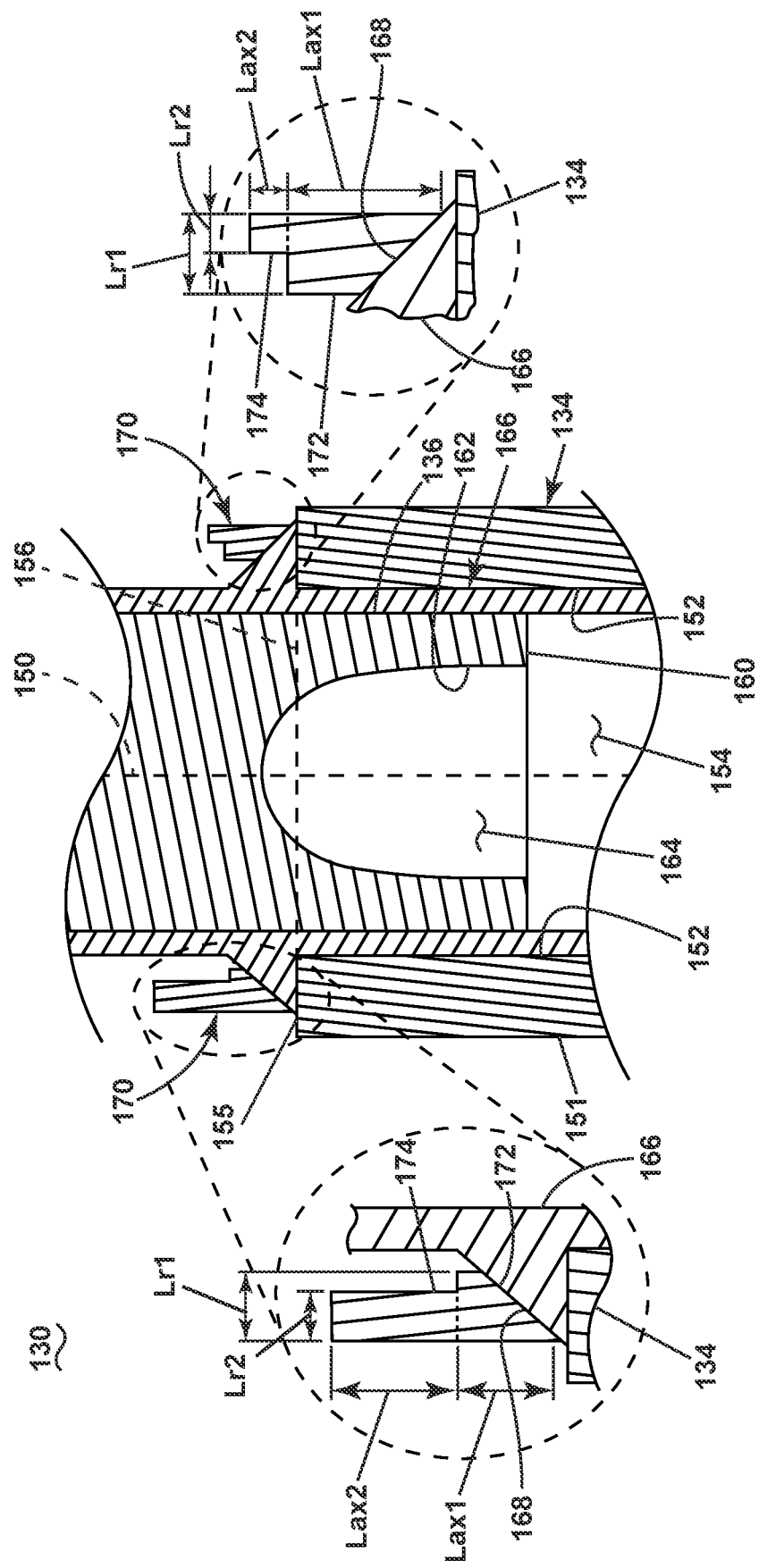
FIG. 3 is a schematic cross-sectional view of a portion of the airfoil assembly as seen from sectional line III-III of FIG. 2, further illustrating a sleeve provided over a portion of the spar, and a balancing insert provided along a portion of the sleeve.

FIG. 3 is a schematic cross-sectional view of a portion of the airfoil assembly 130 as seen from sectional line III-III of FIG. 2. The airfoil 132 (FIG. 2) is removed from the airfoil assembly 130 for illustrative purposes.

The trunnion 134 includes a wall 151 with a set of interior surfaces 152 that at least partially define a socket 154. The trunnion 134 includes an upper edge 155 defining an open top 156 opening to the socket 154. At least a portion of the trunnion 134 can confront the airfoil 132 (FIG. 2) when the spar 136 is received within the airfoil interior 148 (FIG. 2) of the airfoil 132.

The spar 136 includes a centerline axis 150. The spar 136 extends through the open top 156 and into a portion of the socket 154. As illustrated, the spar 136 is received within a respective portion of the socket 154.

The spar 136 terminates within the socket at a distal end 160. The spar 136 can include an interior surface 162 that defines a spar interior 164. The spar interior 164 defines a void within the spar 136 that opens to the distal end 160. As a non-limiting example, the spar interior 164 of the spar can be formed along a respective portion of the distal end 160 such that the spar interior 164 opens into the socket 154 when the spar 136 is received therein. The spar interior 164 can take any suitable shape. As a non-limiting example, the interior surface 162, and hence the spar interior 164, can be arcuate or otherwise form a dome within the spar 136.

The spar 136 can include any suitable material. As a non-limiting example, the spar 136 can include a composite material, foam material, or poly material along a portion of the spar 136. As a non-limiting example, the foam material or the poly material can at least partially define the interior surface 162. In the case of a composite material, the spar 136 can be any suitable composite material such as a 2D or 3D composite, a laminate skin, a woven or a braided composite, or any other suitable composite.

The airfoil assembly 130 further comprises a sleeve 166. The sleeve 166 can extend over a respective portion of the spar 136. The sleeve 166 can extend through the open top 156 and into the socket 154. The sleeve 166 can be provided between the spar 136 and the trunnion 134, specifically radially between the interior surfaces 152 of the trunnion 134 and the spar 136. The sleeve 166 can extend any suitable axial distance. As a non-limiting example, the sleeve 166 can extend axially beyond the distal end 160 and into the socket 154. As a non-limiting example, the sleeve 166 can terminate at or axially prior to the distal end 160. As a non-limiting example, the sleeve 166 can extend along the spar 136 less than, equal to, or greater than a total axial extend of the spar 136. The sleeve 166 can by symmetric or asymmetric about the centerline axis 150.

The sleeve 166 can include a stop 168 that extends radially from a remainder of the sleeve 166 with respect to the centerline axis 150. The stop 168 can extend along a respective portion of the upper edge 155. The stop 168 can take any suitable shape. As a non-limiting example, the stop 168 can include a triangular cross-sectional area when viewed along a plane extending along the centerline axis 150. The stop 168 can extend continuously circumferentially about the centerline axis 150. Alternatively, the stop 168 can be segmented such that a plurality of stops 168 are circumferentially spaced about the centerline axis 150. While the sleeve 166 is illustrated as including the stop 168, it will be appreciated that the stop 168 can be excluded.

The sleeve 166 can be made of any suitable material. As a non-limiting example, the sleeve 166 can include a metallic material. The sleeve 166 can include the same or different material with respect to the trunnion 134 or the spar 136. The sleeve 166 can be positioned about the spar 136 and held in frictional contact with the spar 136. Alternatively, the sleeve 166 can be coupled to (e.g., welded to, bonded to, fastened to, etc.) the spar 136 or integrally formed with the spar 136. The sleeve 166 can be used to further strengthen the airfoil assembly 130. As a non-limiting example, the spar 136 can be made of a relatively soft composite material. The sleeve 166 can be used provide additional structural support to the spar 136.

A balancing insert 170 is provided along a portion of the airfoil assembly 130. As a non-limiting example, the balancing insert 170 can be provided along a portion of the stop 168. As a non-limiting example, the balancing insert 170 can extend axially from the stop 168 and axially away from the trunnion 134. While illustrated as being formed along the stop 168, it will be appreciated that the balancing insert 170 can be provided along any suitable portion of the sleeve 166.

The balancing insert 170 can extend continuously circumferentially about an entirety of the centerline axis 150. Alternatively, the balancing insert 170 can extend circumferentially less than an entirety of centerline axis 150 or otherwise be segmented such that the balancing insert 170 comprises a plurality of balancing inserts 170 circumferentially spaced about the centerline axis 150. The balancing insert 170 can be coupled to (e.g., welded to, bonded to, fastened to, etc.) or integrally formed with the sleeve 166.

The balancing insert 170 can include a set of bodies; as a non-limiting example, a first body 172 and a second body 174. For purposes of illustration, a division between the first body 172 and the second body 174 has been illustrated in phantom lines. The first body 172 can extend from the sleeve 166. The second body 174 can extend from the first body 172. The first body 172 and the second body 174 can extend a first axial length (Lax1) and a second axial length (Lax2), respectively. The first axial length (Lax1) can be equal to, greater than, or less than the second axial length (Lax2). The first body 172 and the second body 174 can extend a first radial length (Lr1) and a second radial length (Lr2), respectively. The first radial length (Lr1) can be equal to, greater than, or less than the second radial length (Lr2). While the first body 172 and the second body 174 are both illustrated as rectangular, it will be appreciated that the balancing insert 170 can include any suitable cross-sectional area when viewed along a plane extending along the centerline axis 150. In other words, the first body 172 and the second body 174 can each include a respective size or mass, with the size or mass being different between the first body 172 and the second body 174. It will be appreciated that the balancing insert 170 can include any number of one or more bodies. It will be appreciated that the first body 172 and the second body 174 can have varying masses or the same mass with respect to one another.

The balancing insert 170 can be symmetric or asymmetric about the centerline axis 150. As illustrated, the balancing insert 170 is asymmetric about the centerline axis 150 such that at least one of the first axial length (Lax1), the second axial length (Lax2), the first radial length (Lr1) and the second radial length (Lr2) varies between radial sides of the centerline axis 150. The first radial length (Lr1), the second radial length (Lr2), the first axial height (Lax1) and the second axial height (Lax2) can be constant or non-constant circumferentially about the centerline axis 150. As a non-limiting example, the first radial length (Lr1) and the second radial length (Lr2) can be non-constant, while the first axial length (Lax1) and the second axial length (Lax2) can be constant circumferentially about the centerline axis 150.

The balancing insert 170 can be made of any suitable material. As a non-limiting example, the balancing insert 170 can be made of a composite material or a metallic material. The material of the balancing insert 170 can include a density that is different from a density of at least one of a material of the trunnion 134, the spar 136 or the sleeve 166.

During operation, the airfoil assembly 130 can experience loading due to the working airflow (Fw) (FIG. 2) flowing over a respective portion of the airfoil assembly 130. The airfoil assembly 130 can rotate about the pitch axis (Pax) (FIG. 2) and cause the center of mass (CM) (FIG. 2) to move. Without the inclusion of the balancing insert 170, the movement of the center of mass (CM) in combination with the loading due to the working airflow (Fw) can cause the airfoil assembly 130 to become unbalanced, which in turn causes vibrational stresses to be experienced across the airfoil assembly 130. It is contemplated that the airfoil assembly 130, as described herein, can include the balancing insert 170 such that the airfoil assembly 130 is balanced during all intended uses of the airfoil assembly 130 (e.g., during all intended pitch variations of the airfoil assembly 130 and during movement of the center of mass (CM)). As such, the balancing insert 170 can be used to limit or otherwise eliminate the vibration stresses associated with the variation of the pitch in the airfoil assembly 130.

The sizing of the balancing insert 170 (e.g., the first axial length (Lax1), the second axial length (Lax2), the first radial length (Lr1) and the second radial length (Lr2)) can be constant or non-constant circumferentially about the centerline axis 150. As a non-limiting example, having a non-constant sizing circumferentially about the centerline axis 150 can, in some cases, ensure that the airfoil assembly 130 is balanced circumferentially about the centerline axis 150.

It is contemplated that the airfoil assembly 130 can be included within a plurality of circumferentially spaced airfoil assemblies. Each airfoil assembly of the plurality of circumferentially spaced airfoil assemblies can be coupled to a respective rotatable component and each including a respective center of mass (CM). In this configuration, a single airfoil assembly 130 being unbalanced can cause the vibrational stresses to be experienced along the plurality of circumferentially spaced airfoil assemblies. As such, each airfoil assembly 130 of the plurality of circumferentially spaced airfoil assemblies can include a respective balancing insert 170 to balance the respective airfoil assembly 130. Alternatively, less than an entirety of the plurality of circumferentially spaced airfoil assemblies (e.g. every other airfoil assembly 130) can include a respective balancing insert 170. The balancing insert 170 can be the same or different between each airfoil assembly of the plurality of circumferentially spaced airfoil assemblies. The use of the balancing insert 170 can ensure that the plurality of circumferentially spaced airfoil assemblies are balanced when the working airflow (Fw) flows over the plurality of circumferentially spaced airfoil assemblies.

Figure 4:
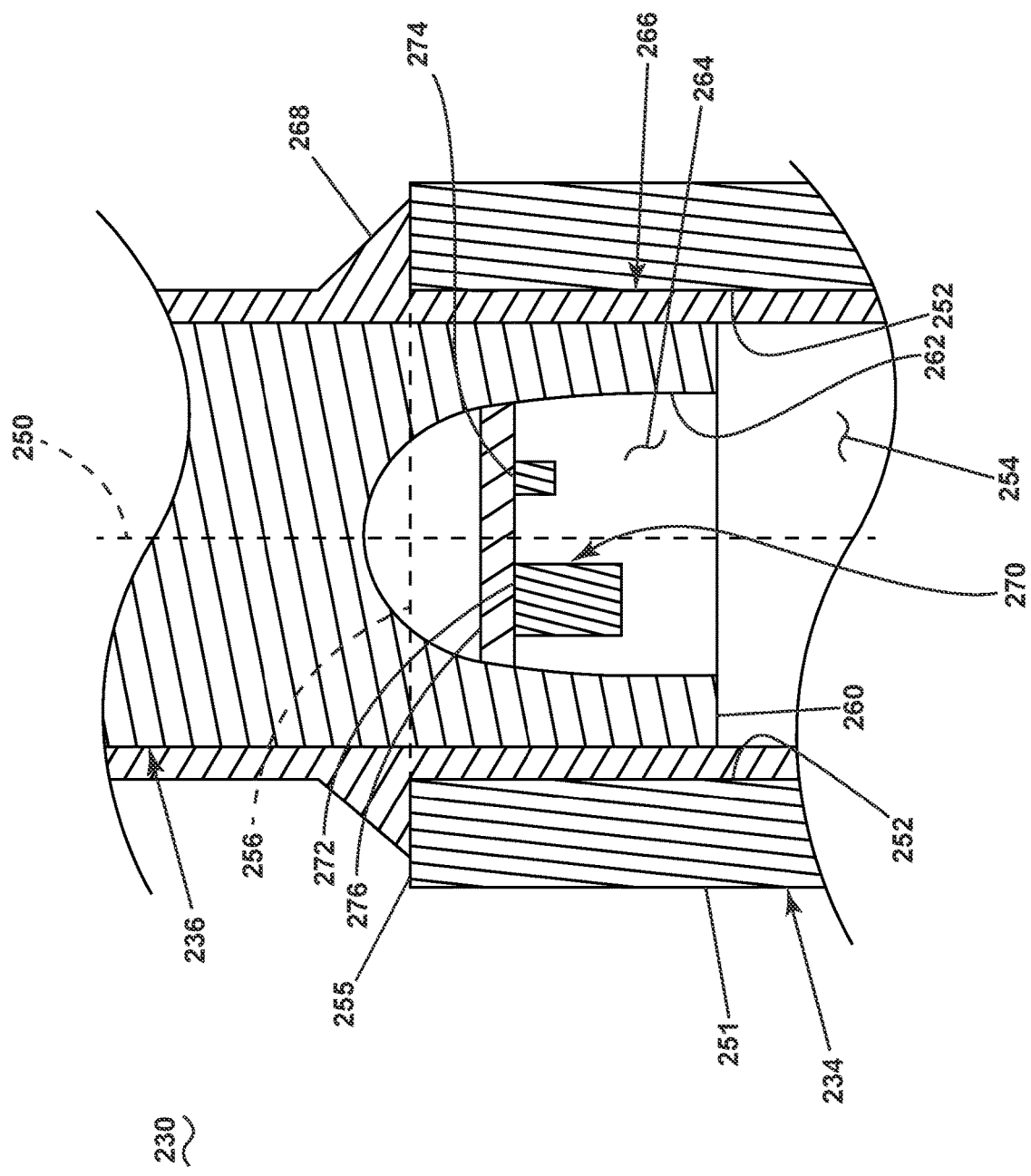
FIG. 4 is a schematic cross-sectional view of an exemplary airfoil assembly suitable for use as the airfoil assembly of FIG. 2, further illustrating a trunnion, a spar including an interior, and a balancing insert including a first body and a second body, the balancing insert being provided within a portion of the interior.

FIG. 4 is a schematic cross-sectional view of an airfoil assembly 230 suitable for use as the airfoil assembly 130 of FIG. 2. The airfoil assembly 230 is similar to the airfoil assembly 130; therefore, like parts will be identified with like numerals increased to the 200 series with it being understood that the description of the airfoil assembly 130 applies to the airfoil assembly 230 unless noted otherwise.

The airfoil assembly 230 includes a trunnion 234 and spar 236. The trunnion 234 includes a wall 251 defining a set of interior surfaces 252. The set of interior surface 252 at least partially define a socket 254. The trunnion 234 includes an upper edge 255 defining an open top 256 opening into the socket 254. The spar 236 includes a centerline axis 250. The spar 236 terminates at a distal end 260 within the socket 254. The spar 236 includes an interior surface 262 at least partially defining a spar interior 264 defining a void within the spar 236. The airfoil assembly 230 can further include a sleeve 266 extending along the spar 236 and provided between the spar 236 and the trunnion 234. The sleeve 266 can extend any suitable axial distance. As a non-limiting example, the sleeve 266 can extend axially beyond the distal end 260 and into the socket 254. The sleeve 266 can optionally include a stop 268 resting on the upper edge 255. It will be appreciated that the sleeve 266 can be omitted from the airfoil assembly 230 such that the spar 236 directly contacts the trunnion 234.

The airfoil assembly 230 is similar to the airfoil assembly 130 (FIG. 2) in that it includes a balancing insert 270. The balancing insert 270 is used for the same functional effect of keeping the rotating component that the airfoil assembly 230 is coupled to in rotational balance as the airfoil assembly 230 is changed in pitch. However, the location of the balancing insert 270 is different from the balancing insert 170 (FIG. 2). The balancing insert 270, unlike the balancing insert 170, is coupled to the spar 236 rather than being coupled to or provided along the sleeve 266. Further, a rib 276 can be provided within the spar interior 264. The rib 276 can extend between opposing portions of the interior surface 262. While illustrated as a rectangular rib, it will be appreciated that the rib 276 can take any suitable shape. As a non-limiting example, the rib 276 can conform to and extend along a respective portion of the interior surface 262. The rib 276 can further extend circumferentially along an entirety of or less than the entirety of the centerline axis 250. The rib 276 can be coupled to or otherwise provided within (e.g., integrally formed with) the spar 236.

The balancing insert 270 can be provided within the spar interior 264. The balancing insert 270 can extend from the rib 276. The balancing insert 270 can include a set of bodies; as a non-limiting example, a first body 272 and a second body 274. The first body 272 and the second body 274 can extend from respective portions of the rib 276 and into the spar interior 264. It is contemplated that at least a portion of the balancing insert 270 can extend into the socket 254. The first body 272 can be provided on an axially opposing radial side of or on the same radial side of the rib 276 with respect to the second body 274. The balancing insert 270 can extend circumferentially about an entirety or less than an entirety of the centerline axis 250. The balancing insert 270 can be integrally formed or coupled to the rib 276.

As the balancing insert 270 is not provided along the sleeve 266, the sleeve 266 can be removed from the construction of the airfoil assembly 230. This, in turn, can reduce the weight, complexity and manufacturing burden of the airfoil assembly 230 when compared to the airfoil assembly 130.

Figure 5:
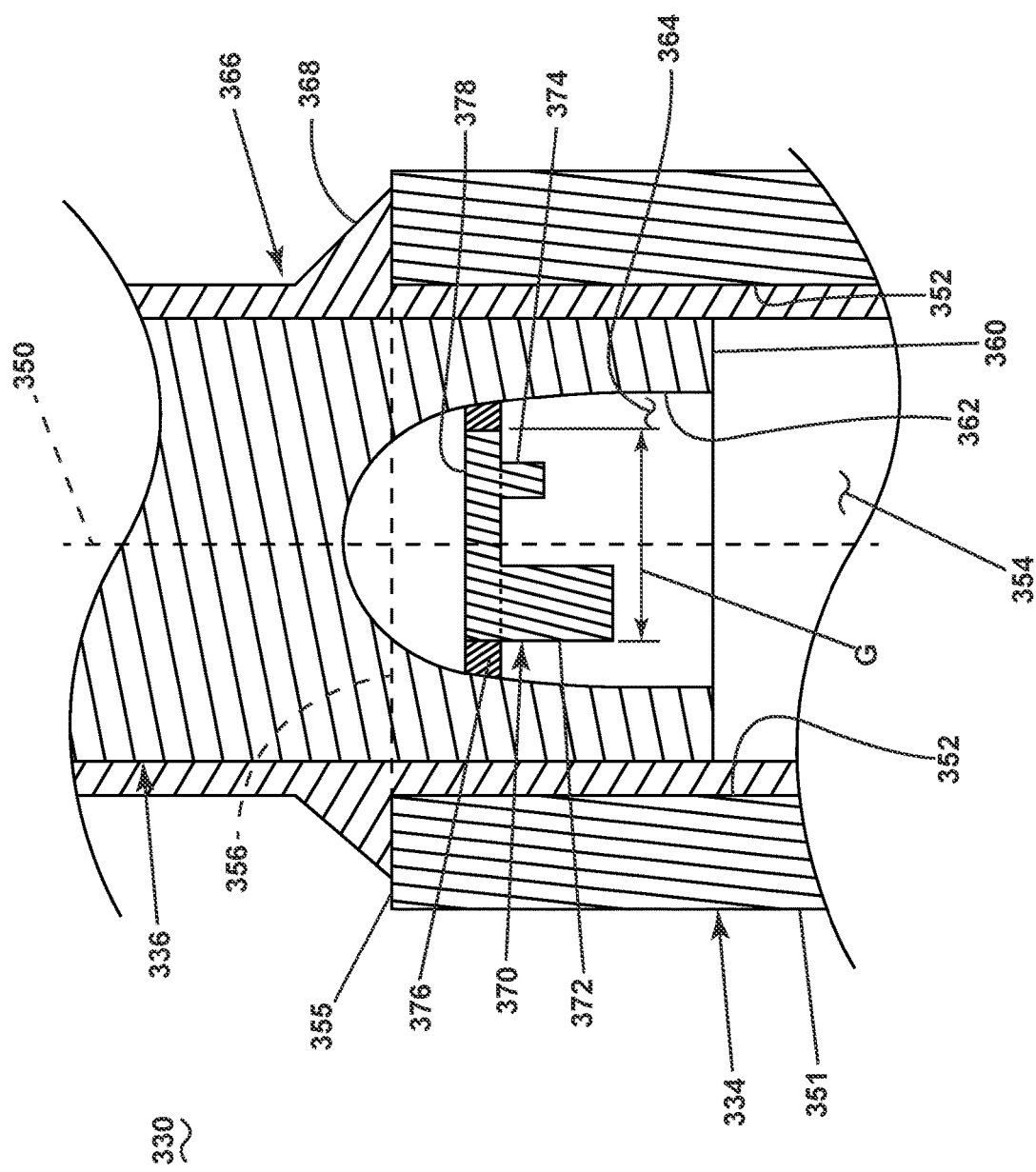
FIG. 5 is a schematic cross-sectional view of an exemplary airfoil assembly suitable for use as the airfoil assembly of FIG. 2, further illustrating a trunnion, a spar including an interior, and a balancing insert including a first body, a second body and a rib, the balancing insert being provided within a portion of the interior.

FIG. 5 is a schematic cross-sectional view of an airfoil assembly 330 suitable for use as the airfoil assembly 130 of FIG. 2. The airfoil assembly 330 is similar to the airfoil assemblies 130, 230 (FIG. 4); therefore, like parts will be identified with like numerals increased to the 300 series with it being understood that the description of the airfoil assembly 130, 230 applies to the airfoil assembly 330 unless noted otherwise.

The airfoil assembly 330 includes a trunnion 334 and spar 336. The trunnion 334 includes a wall 351 defining a set of interior surfaces 352. The set of interior surface 352 at least partially define a socket 354. The trunnion 334 includes an upper edge 355 defining an open top 356 opening into the socket 354. The spar 336 includes a centerline axis 350. The spar 336 terminates at a distal end 360 within the socket 354. The spar 336 includes an interior surface 362 at least partially defining a spar interior 364 defining a void within the spar 336. The airfoil assembly 330 can further include a sleeve 366 extending along the spar 336 and provided between the spar 336 and the trunnion 334. The sleeve 366 can extend any suitable axial distance. As a non-limiting example, the sleeve 366 can extend axially beyond the distal end 360 and into the socket 354. The sleeve 366 can optionally include a stop 368 resting on the upper edge 355. It will be appreciated that the sleeve 366 can be omitted from the airfoil assembly 330 such that the spar 336 directly contacts the trunnion 334.

The airfoil assembly 330 is similar to the airfoil assemblies 130 (FIG. 2), 230 (FIG. 3) in that it includes a balancing insert 370, specifically a balancing insert 370 provided within the spar interior 364 like the balancing insert 270 (FIG. 4). The location of the balancing insert 370 is different from the balancing insert 270 and is for the same functional effect of keeping the rotating component that the airfoil assembly 330 is coupled to in rotational balance as the airfoil assembly 330 is changed in pitch. The spar 336 further includes a rib 376. The rib 376 defines a respective portion of the interior surface 362. The rib 376, however, does not extend across a full radial extent of the spar interior 364. Instead, the rib 376 extends radially inward from the interior surface 362 and terminates within the spar interior 364 to define a gap (G) between opposing portions of the rib 376.

The balancing insert 370 can include a transverse body 378 extending through the gap (G). The balancing insert 370 can include a set of bodies extending from respective portions of the transverse body 378; as a non-limiting example, a first body 372 and a second body 374. For purposes of illustration, division between the first body 372, the second body 374 and the transverse body 378 have been shown in phantom lines. The balancing insert 370 can be symmetric or asymmetric about the centerline axis 350.

The balancing insert 370 can include any suitable material. As a non-limiting example, the balancing insert 370 can include a first material having a first density and the spar 336 can include a second material having a second density. The first density can be larger than the second density. As a non-limiting example, the first material can include a steel or a lead material such that the first material is significantly denser than the second material.

It is contemplated that with the transverse body 378, the balancing insert 370 is defined by a continuous insert. As a non-limiting example, the balancing insert 370 can be formed as a disc when viewed along a plane perpendicular to the centerline axis 350. It is contemplated that the balancing insert 370 can be removably coupled to the airfoil assembly 330. As a non-limiting example, the balancing insert 370 can be snap fit or otherwise coupled to the spar 336 within the spar interior 364.

The removability of the balancing insert 370 can result in an increased variation in the balancing of the airfoil assembly 330 when compared to the airfoil assemblies 130, 230. For example, each airfoil assembly 330 can be formed without a balancing insert 370 but instead with a location to couple the balancing insert to the airfoil assembly 330 (e.g., along the spar 336 or the sleeve 366). In other words, the spar 336 can be formed identically between airfoil assemblies 330 regardless of where the airfoil assembly 330 will be provided within, for example, the turbine engine 10 of FIG. 1. The balancing insert 370 can then be manufactured for the intended implementation of the specific airfoil assembly 330. As a non-limiting example, an airfoil assembly 330 in one location of the turbine engine may require larger bodies to properly balance the airfoil assembly 330 than an airfoil assembly 330 provided in another location of the turbine engine. As such, the airfoil assembly 330 has a greatly reduced burden of manufacture and an increased variation in balancing when compared to the airfoil assembly 130, 230.

It will be appreciated that certain aspects of the airfoil assemblies 130 (FIG. 3), 230 (FIG. 4), 330 (FIG. 5) can be combined. As a non-limiting example, an airfoil assembly can include the balancing insert 170 formed along the sleeve 166, 266, 366 in combination with another balancing insert 270, 370 provided along the spar 136, 236, 336.

Benefits associated with the present disclosure include a variable pitch airfoil assembly with improve balancing when compared to a conventional variable pitch airfoil assembly. For example, the conventional variable balancing assembly can be formed to be balanced during a single intended use of the variable pitch airfoil assembly, however, once the pitch is changed, the variable pitch airfoil assembly can be unbalanced and result in vibrational stresses being experienced across the variable pitch airfoil assembly. The vibrational stresses can ultimately reduce the lifespan of the variable pitch airfoil assembly. The variable pitch airfoil assembly, as described herein, however, includes the balancing insert which is used to properly balance the variable pitch airfoil assembly at a greater range of pitches when compared to the conventional variable pitch airfoil assembly. This increased balancing through use of the balancing insert ultimately reduces the vibration stress, which ultimately increases the lifespan of the variable pitch airfoil assembly when compared to the conventional variable pitch airfoil assembly.

Additional benefits of the present disclosure include a variable pitch airfoil assembly with a decreased complexity and weight when compared to the conventional variable pitch airfoil assembly. For example, the conventional variable pitch assembly can include a complex and large system of lever arms connected to a mechanism (e.g., a motor) within the turbine engine in order to change the pitch of the variable pitch airfoil assembly and hold the variable pitch airfoil assembly at the desired pitch. As the conventional variable pitch airfoil assembly does not include the balancing insert, as described herein, the conventional variable pitch airfoil assembly will be out of balance when the pitch is changed. As such, the size, strength and weight of the system of lever arms needs to be increased to ensure that the conventional variable pitch airfoil assembly maintains it pitch. The variable pitch airfoil assembly as described herein, however, includes the balancing insert that balances the variable pitch airfoil assembly over a broad range of intended pitches. This, in turn, means that the system of lever arms can be less complex in order to balance the variable pitch airfoil assembly when compared to the conventional variable pitch airfoil assembly. It is contemplated that the size of the system of lever arms can be greatly reduced with the use of the variable pitch airfoil assembly. This, in turn, decreases the complexity of and weight of the system needed to balance the variable pitch airfoil assembly when compared to the conventional variable pitch airfoil assembly.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine comprising a fan section, a compressor section, a combustion section, and a turbine section in serial flow arrangement and defining a stator portion and a rotor portion, which rotates about an engine centerline, wherein the rotor portion comprises a variable pitch airfoil assembly having an airfoil defining an airfoil interior, and a balancing insert provided along at least a portion of the variable pitch airfoil assembly to maintain a balance of the variable pitch airfoil assembly.

A composite airfoil assembly comprising a composite airfoil defining an airfoil interior, a composite spar having a centerline axis, the composite spar having a portion located within the airfoil interior and terminating at a distal end, with at least a portion of the composite spar having a spar interior defining a void opening to the distal end, a trunnion having socket extending from an open top, the composite spar extending through the open top and into the socket, and a balancing insert provided along a portion of the composite airfoil assembly to maintain a balance of the composite airfoil assembly.

A variable pitch airfoil assembly comprising an airfoil defining an airfoil interior a spar having a centerline axis, the spar having a portion located within the airfoil interior and terminating at a distal end, with at least a portion of the spar having a spar interior defining a void opening to the distal end, a sleeve provided along at least a portion of the spar, a trunnion having socket extending from an open top, the spar and the sleeve extending through the open top and into the socket, with the sleeve being provided between the trunnion and the spar, and a balancing insert being one of either provided within the spar interior or along the sleeve.

A turbine engine comprising a fan section, a compressor section, a combustion section, and a turbine section in serial flow arrangement and defining a stator portion and a rotor portion, which rotates about an engine centerline, wherein the rotor portion comprises a composite variable pitch airfoil assembly having a composite airfoil defining an airfoil interior, and a balancing insert provided along at least a portion of the composite variable pitch airfoil assembly to maintain a balance of the variable pitch airfoil assembly.

An airfoil assembly comprising a airfoil defining an airfoil interior, a spar having a centerline axis, the spar having a portion located within the airfoil interior and terminating at a distal end, with at least a portion of the spar having a spar interior defining a void opening to the distal end, a trunnion having socket extending from an open top, the spar extending through the open top and into the socket, and a balancing insert provided along a portion of the composite airfoil assembly to maintain a balance of the variable pitch airfoil assembly.

A composite variable pitch airfoil assembly comprising a composite airfoil defining an airfoil interior a composite spar having a centerline axis, the composite spar having a portion located within the airfoil interior and terminating at a distal end, with at least a portion of the composite spar having a spar interior defining a void opening to the distal end, a metallic sleeve provided along at least a portion of the composite spar, a trunnion having socket extending from an open top, the composite spar and the sleeve extending through the open top and into the socket, with the metallic sleeve being provided between the trunnion and the spar, and a balancing insert being one of either provided within the spar interior or along the metallic sleeve.

The turbine engine of any preceding clause, wherein the balancing insert comprises a first body and a second body.

The turbine engine of any preceding clause, wherein the first body and the second body have varying masses with respect to one another.

The turbine engine of any preceding clause, wherein the balancing insert comprises a transverse body interconnecting the first body and the second body.

The turbine engine of any preceding clause, wherein the variable pitch airfoil assembly further comprises a spar having a centerline axis, the spar having a portion located within the airfoil interior and terminating at a distal end, with at least a portion of the spar having a spar interior surface defining a spar interior, and a trunnion having socket extending from an open top, the spar extending through the open top and into the socket, with the spar interior opening to the socket.

The turbine engine of any preceding clause, wherein the balancing insert is one of either provided within the spar interior.

The turbine engine of any preceding clause, wherein the balancing insert extends between opposing portions of the spar interior surface.

The turbine engine of any preceding clause, wherein the balancing insert is provided within the spar interior and extends between opposing portions of the spar interior surface.

The turbine engine of any preceding clause, wherein the variable pitch airfoil assembly further comprises a sleeve extending along at least a portion of the spar.

The turbine engine of any preceding clause, wherein the trunnion includes an upper edge defining the open top, the sleeve includes a stop formed along a portion of the sleeve and extending radially along a respective portion of the upper edge, and the balancing insert is provided along the stop.

The turbine engine of any preceding clause, wherein the balancing insert is removably coupled to the sleeve or the spar.

The turbine engine of any preceding clause, wherein the balancing insert is symmetric about the centerline axis.

The turbine engine of any preceding clause, wherein the balancing insert is asymmetric about the centerline axis.

The turbine engine of any preceding clause, wherein the balancing insert extends continuously, circumferentially about the centerline axis.

The turbine engine of any preceding clause, wherein the variable pitch airfoil assembly is provided within the fan section The turbine engine of any preceding clause, wherein the rotor portion comprises a plurality of circumferentially spaced variable pitch airfoil assemblies, with at least a portion of the variable pitch airfoil assemblies of the plurality of circumferentially spaced variable pitch airfoil assemblies including a respective balancing insert.

The composite airfoil assembly of any preceding clause, wherein the balancing insert includes one of either a composite material or a metallic material.

The composite airfoil assembly of any preceding clause, wherein the balancing insert includes a metallic material with a higher density than a density of a composite material of the composite spar.

The composite airfoil assembly of any preceding clause, wherein the balancing insert is provided within the spar interior of the composite spar.

The composite airfoil assembly of any preceding clause, further comprising a metallic sleeve provided between the trunnion and the composite spar, with the balancing insert being provided along a respective portion of the metallic sleeve.

The turbine engine of any preceding clause, wherein the first body includes a first axial length and the second body includes a second axial length with respect to the centerline axis.

The turbine engine of any preceding clause, wherein the first axial length is non-equal to the second axial length.

The turbine engine of any preceding clause, wherein the first axial length is greater than or equal to the second axial length.

The turbine engine of any preceding clause, wherein at least one of the first axial length or the second axial length is non-constant circumferentially about the centerline axis.

The turbine engine of any preceding clause, wherein the first body includes a first radial length and the second body includes a second radial length with respect to the centerline axis.

The turbine engine of any preceding clause, wherein the first radial length is non-equal to the second radial length.

The turbine engine of any preceding clause, wherein the first radial length is greater than or equal to the second radial length.

The turbine engine of any preceding clause, wherein at least one of the first radial length or the second radial length is non-constant circumferentially about the centerline axis.

The turbine engine of any preceding clause, wherein the balancing insert is segmented about the centerline axis.

The turbine engine of any preceding clause, wherein the airfoil assembly includes a plurality of balancing inserts provided on both of the sleeve and the spar.

What is claimed is:
1. A turbine engine comprising:
a fan section, a compressor section, a combustion section, and a turbine section in serial flow arrangement and defining a stator portion and a rotor portion, which rotates about an engine centerline, wherein the rotor portion comprises:

a variable pitch airfoil assembly having:
- an airfoil having an outer wall bounding an airfoil interior;
- a spar having an interior surface defining a spar interior;
- a trunnion having a socket extending from an open top, the spar extending through the open top and into the socket; and
- a balancing insert provided along at least a portion of the variable pitch airfoil assembly to maintain a balance of the variable pitch airfoil assembly;
- wherein the balancing insert is one of either:
  - provided within a portion of the spar interior located within the trunnion; or
  - positioned along a respective portion of a sleeve of the variable pitch airfoil assembly.

2. The turbine engine of claim 1, wherein the balancing insert comprises a first body and a second body.

3. The turbine engine of claim 2, wherein the first body and the second body have varying masses with respect to one another.

4. The turbine engine of claim 2, wherein the balancing insert comprises a transverse body interconnecting the first body and the second body.

5. The turbine engine of claim 1, wherein the spar has a centerline axis, the spar having a portion located within the airfoil interior and terminating at a distal end.

6. The turbine engine of claim 5, wherein the balancing insert is provided within the spar interior and extends between opposing portions of the interior surface.

7. The turbine engine of claim 5, wherein the sleeve extends along at least a portion of the spar.

8. The turbine engine of claim 7, wherein:
- the trunnion includes an upper edge defining the open top;
- the sleeve includes a stop formed along a portion of the sleeve and extending radially along a respective portion of the upper edge; and
- the balancing insert is provided along the stop.

9. The turbine engine of claim 7, wherein the balancing insert is removably coupled to the sleeve or the spar.

10. The turbine engine of claim 5, wherein the balancing insert is symmetric about the centerline axis.

11. The turbine engine of claim 5, wherein the balancing insert is asymmetric about the centerline axis.

12. The turbine engine of claim 5, wherein the balancing insert extends continuously, circumferentially about the centerline axis.

13. The turbine engine of claim 1, wherein the variable pitch airfoil assembly is provided within the fan section.

14. The turbine engine of claim 1, wherein the rotor portion comprises a plurality of circumferentially spaced variable pitch airfoil assemblies, with at least a portion of the variable pitch airfoil assemblies of the plurality of circumferentially spaced variable pitch airfoil assemblies including a respective balancing insert.

15. A composite airfoil assembly comprising:
- a composite airfoil having an outer wall bounding an airfoil interior;
- a composite spar having a centerline axis, the composite spar having a portion located within the airfoil interior and terminating at a distal end, with at least a portion of the composite spar having a spar interior defining a void opening to the distal end;
- a trunnion having socket extending from an open top, the composite spar extending through the open top and into the socket;
- a balancing insert provided along a portion of the composite airfoil assembly to maintain a balance of the composite airfoil assembly; and
- a sleeve provided between the trunnion and the composite spar, with the balancing insert being provided along a respective portion of the sleeve.

16. The composite airfoil assembly of claim 15, wherein the balancing insert includes one of either a composite material or a metallic material.

17. The composite airfoil assembly of claim 16, wherein the balancing insert includes a metallic material with a higher density than a density of a composite material of the composite spar.

18. The composite airfoil assembly of claim 15, wherein the sleeve is a metallic sleeve provided between the trunnion and the composite spar, with the balancing insert being provided along the respective portion of the metallic sleeve.

19. A variable pitch airfoil assembly comprising:
- an airfoil having an outer wall bounding an airfoil interior;
- a spar having a centerline axis, the spar having a portion located within the airfoil interior and terminating at a distal end, with at least a portion of the spar having a spar interior defining a void opening to the distal end;
- a sleeve provided along at least a portion of the spar;
- a trunnion having socket extending from an open top, the spar and the sleeve extending through the open top and into the socket, with the sleeve being provided between the trunnion and the spar; and
- a balancing insert being provided within a portion of the spar interior located within the trunnion, or along the sleeve.

20. The variable pitch airfoil assembly of claim 19, wherein the sleeve extends into the airfoil interior.

* * * * *